United States Patent [19]
Catelli

[11] Patent Number: 5,143,152
[45] Date of Patent: Sep. 1, 1992

[54] HEAT EXCHANGER APPARATUS AND METHOD FOR PROCESSING FRUITS AND VEGETABLES

[75] Inventor: Camillo Catelli, Parma, Italy

[73] Assignee: Rossi & Catelli S.p.A., Parma, Italy

[21] Appl. No.: 746,197

[22] Filed: Aug. 15, 1991

Related U.S. Application Data

[63] Continuation of Ser. No. 575,779, Aug. 31, 1990, abandoned.

[30] Foreign Application Priority Data

Sep. 29, 1989 [IT]   Italy ............................... 40144 A/89

[51] Int. Cl.$^5$ ............................................. F28D 7/10
[52] U.S. Cl. ..................................... 165/154; 165/155
[58] Field of Search .................... 165/151, 154, 155

[56] References Cited
U.S. PATENT DOCUMENTS

| | | | |
|---|---|---|---|
| 2,362,985 | 11/1944 | Brown, Jr. ......................... | 165/154 |
| 3,976,126 | 8/1976 | Ruff ..................................... | 165/110 |
| 4,364,514 | 12/1982 | Toporek ............................. | 237/55 |

FOREIGN PATENT DOCUMENTS

| | | | |
|---|---|---|---|
| 132576 | 7/1902 | Fed. Rep. of Germany ...... | 165/155 |
| 172259 | 6/1906 | Fed. Rep. of Germany ...... | 165/155 |
| 3238513 | 4/1984 | Fed. Rep. of Germany ...... | 165/155 |
| 844442 | 7/1939 | France ................................ | 165/154 |
| 50274 | 1/1940 | France ................................ | 165/154 |

Primary Examiner—Allen J. Flanigan
Attorney, Agent, or Firm—Flehr, Hohbach, Test, Albritton & Herbert

[57] ABSTRACT

A heat exchanger suitable for processing fruits, vegetables and other agricultural products and particularly tomatoes. Agricultural products to be heated are first triturated, cut, mashed or otherwise crushed and then passed through one or more product passageways in the heat exchanger. Steam is passed through one or more heating fluid passageways separated from, but in close heat exchange relationship with the product passageway. In order to attain high heat transfer from the steam to the agricultural product, the distance from the heating fluid passageway to the product in the product passageway is kept to a practical minimum. The product passageways are configured to accommodate large foreign objects such as twigs, pieces of plant, weeds and the like which are frequently included in the stream of triturated agricultural product.

20 Claims, 2 Drawing Sheets

HEAT EXCHANGER APPARATUS AND METHOD FOR PROCESSING FRUITS AND VEGETABLES

This is a continuation of application Ser. No. 07/575,779 filed Aug. 31, 1990.

FIELD OF THE INVENTION

This invention relates to a heat exchanger suitable for processing fruits, vegetables and other agricultural products and particularly tomatoes. Agricultural products to be heated are usually first triturated, cut, mashed or otherwise crushed and then passed through one or more product passageways in the heat exchanger. Steam is passed through one or more heating fluid passageways separated from, but in close heat exchange relationship with the product passageway. In order to attain high heat transfer from the steam to the agricultural product, the distance from the heating fluid passageway to the product in the product passageway is kept to a practical minimum. In this environment large foreign objects such as twigs, pieces of plant, weeds and the like are frequently included in the stream of triturated agricultural product.

BACKGROUND OF THE INVENTION

The invention concerns a heat exchanger for fruits, vegetables and other agricultural products whereby the product may be heated by a close association with steam. Ordinarily the product is usually triturated, crushed, mashed or otherwise cut to the form of small pieces and juice. To simplify the description we will hereinafter refer to the invention in relationship to its use in heating tomatoes and particularly to tomatoes which are triturated, cut or otherwise crushed.

The heat exchangers for triturated tomatoes presently in use are for the most part of the tube-bundle or tube-chest type. That is, they are equipped with a number of tubes anchored to two tube end plates and enclosed in a generally cylindrical shell. Ordinarily the tubes have a diameter of about 20 to 50 mm. Heating fluid, usually steam and frequently super heated steam, is fed to the cylindrical shell while the triturated tomatoes to be heated are passed through the inside of the tubes in the tube-chest. The heat exchange, of course, is accomplished by the tomatoes and the steam being in close heat exchange relationship on opposite sides of the tube surfaces.

Because of the rapid heat exchange through the walls of the tubes the temperature on the inside surface of the tube is frequently well above 150° C. Such high temperature may cause the product to "burn on" to the inside walls of the tubes, particularly if the product movement along the walls is slow.

In recent decades, the harvesting of agricultural products has been extensively mechanized, even to the extent of developing special varieties of plants whose fruits ripen simultaneously so that the entire plant can be harvested and the fruit stripped from the whole plant. Such mechanization has many advantages but one disadvantage is that the mechanized harvester frequently collects more than the desired products. In addition to the product, mechanical harvesters often collect unwanted vines, weeds, sticks, grass and particularly portions of the very plant from which the product is harvested. Because of these harvesting methods, extensive steps are taken by the processors of agricultural products to cull the harvested products from the debris. Even so, significant quantities of debris frequently follow the harvest into the processing apparatus. It is impossible to avoid the presence of plant parts, weeds, vines, grass, etc. with the product to be processed.

In the case of processing which requires heat exchange apparatus the problem is particularly acute. Much of the debris, such as the twigs, roots or other parts of the harvested plant, has an elongated shape. In the case of the tube nest heat exchanger which has been in use all through the development of mechanical harvesting, the elongated debris has the tendency to block the entrance of the individual tubes thereby slowing the flow of the product therethrough. In addition, if and when the debris itself enters the tube, its dimension is often such that it is squeezed between the opposite walls of the tube thereby creating friction and a slowing of the flow.

As mentioned above, the flow of product through the tubes of the tube nest increases the possibility of product burn-on the inside of the tubes. The increased burn-on itself forms an obstruction within the tubes which, of course, further lowers the flow rate and causes even more burn-on. Moreover, the reduced flow rate increases the pressure drop through the heat exchanger. In order to remove scale, foreign material and burned-on product, the tube-nest heat exchanger must be shut down and dismantled for cleaning. The interior of the individual tubes are then brushed out with appropriate mechanical means. This step is usually very laborious and involves a substantial decrease in the productivity of the system. Because of the increased burn-on and increased pressure drop due to the presence of foreign matter in the tube-chest it is necessary to shut down, dismantle and clean the tubes of the heat exchanger far more frequently than would otherwise be the case.

OBJECTS AND SUMMARY OF THE INVENTION

The purpose of the present invention is to eliminate the above mentioned problems by supplying a heat exchanger which, while substantially maintaining the same thermal exchange capacity as a tube-chest heat exchanger with similar dimensions, to drastically cut down the danger of obstruction due in particular to the presence of plants, vines, weeds, grass, shrubs and other foreign materials in the triturated tomatoes. In contrast with known types of heat exchangers this invention offers the advantage of improved heat exchange capacity of the apparatus, lower pressure drops within the product tubes and less frequent dismantling of the apparatus for clean up.

The above goals and advantages, as well as others, are all obtained by an exchanger which includes passages for the tomatoes having at least one cross sectional dimension greater than the dimension of the expected plants, vines, etc. In the preferred embodiment the invention includes a container equipped with an inlet and an outlet orifice having an external heating shell and an internal heating body which, with the internal surface of the container itself, forms a narrow jacket or hollow space inside which the triturated tomatoes flow. A large diameter product input line is gradually shaped to guide and direct the product and the elongated debris toward the product passages of the heat exchanger so as to avoid the debris being extended across a narrow dimension of the passage. Further characteristics and advantages offered by this invention will be more fully explained in the detailed description hereinafter where a preferred, but not exclusive, shape of the heat exchanger is described and illustrated as an example.

DETAILED DESCRIPTION OF THE INVENTION

Figure 1:
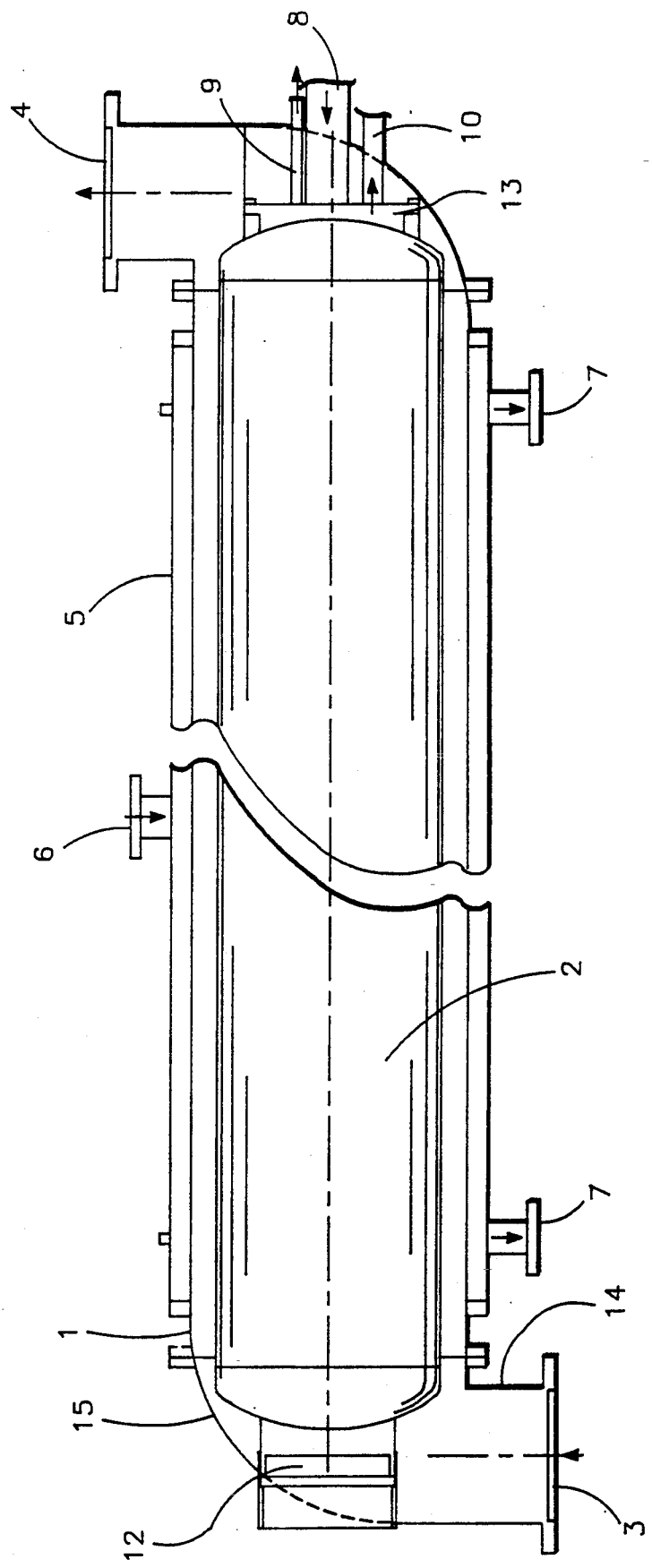
FIG. 1 is a schematic side view of a preferred embodiment of the invention, the drawing having some parts removed to better emphasize others.

Referring to FIG. 1, a preferred heat exchanger in accordance with the invention includes a cylindrical container 1 having an elongated shape at one end of which is an inlet orifice 3 and at the opposite end an outlet orifice 4 for triturated tomatoes. The exchanger is shown in horizontal position but can also be positioned vertically or in any other intermediate position. Both the inlet and the outlet orifices are arranged with their respective axes perpendicular to the container's axis and are connected to the container. These orifices may, however, be arranged other than perpendicular to the axis of the container.

Inside the container 1 is a heating body 2 which is also cylindrical in shape and which runs along substantially the entire length of the container 1. The heating body is preferably arranged coaxially to the container 1 and is hollow. The heating body 2 is shaped and arranged in such a manner as to form between its external surface and the internal surface of the container, a free annular hollow space or jacket 11 interconnecting the container's inlet and outlet orifices.

It should be noted that the inlet 14 of the inlet orifice 3 is a large open cross section and may be circular having a diameter such as about 300 mm so that debris of substantial length may be received in any orientation. The shape of the inlet orifice, however, is such that it is gradually transformed from the larger diameter circular opening at 14 to an annular shape at that portion 15 which connects with the jacket 11. The transition from circular to annular is smooth and gradual so that elongated debris passing through the inlet 14 of the orifice 3 is turned to fit through the annular opening 15 to the jacket 11 rather than being lodged crosswise across the opening to the jacket 11 or in the inlet orifice 3 itself.

In order to keep the hollow space 11 completely free of obstruction, the heating body 2 is provided with supports 12 and 13 secured at each end thereof which supports extend through the inlet orifice 3 and outlet orifice 4, respectively and are secured and sealed thereto thereby supporting the central heating body 2 substantially concentric to the container 1 without obstructing the annular hollow space or jacket 11.

An inlet pipe or tube 8 passes through the support 13, as well as the outlet orifice 4 in sealing relationship. The inlet 8 provides passage for heating fluid such as steam to the interior of the heating body 2. Similarly, two outlets 9 and 10 likewise pass through the support 13 and the outlet 4 in a sealing relationship. The outlets 9 and 10 are provided for the extraction of heating fluid condensate, as well as gases which have not been reduced to a condensate. Neither the inlet 8 nor the outlets 9 and 10 are placed in communication with the inside of the jacket 11 but only with the inside of the heating body 2.

A heating shell 5 is provided outside the container 1 and is arranged in such a manner as to form an external covering to the container. The shell 5 is provided with an inlet 6 and a pair of outlets 7 for the passage of heating fluid which is generally, but not exclusively, steam. The shell 5 is also cylindrical and is arranged coaxially with respect to the container 1. The hollow space of jacket 11 situated between the heating body 2 and the shell 5 has a constant straight annular cross section.

Figure 3:
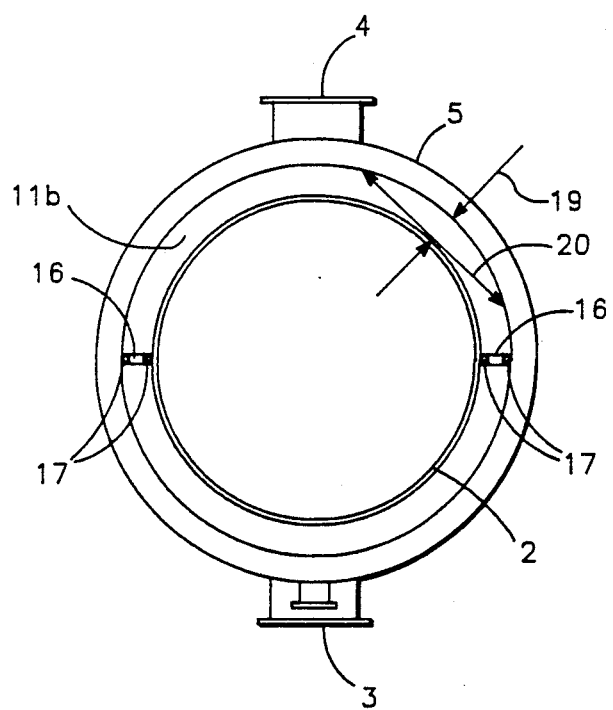
FIG. 3 is a sectional view taken along the lines III—III of FIG. 2.

In view of its geometry, the jacket 11 does not present any obstacle to the flow of the triturated tomatoes. Neither plants, weed, grass, vines, shrubs or other foreign material obstructs the hollow space and the exchanger therefore resolves the problem of obstruction caused in the tube chest heat exchanger of the prior art. The height of the hollow space or jacket, as typically shown as dimension 19 in FIG. 3, is maintained within the same order of magnitude as the diameter of the tube in the tube chest heat exchanger having the same exchange capacity. Thus, the maximum distance from the wall of the steam passage to the interior of the stream of product is approximately the same for the heat exchanger of the present invention as it is for the tube chests of the prior art. However, because of the annular shape of the jacket 11, the effective width of the passage, as typically shown as dimension 20 in FIG. 3, is substantially greater than 20 to 50 mm diameter of the tubes in the tube chests. The wide dimension of the hollow space or jacket is such that it allows foreign bodies to pass easily without appreciably decreasing the thermal exchange capacity between the heating fluid and the triturated tomatoes.

Figure 2:
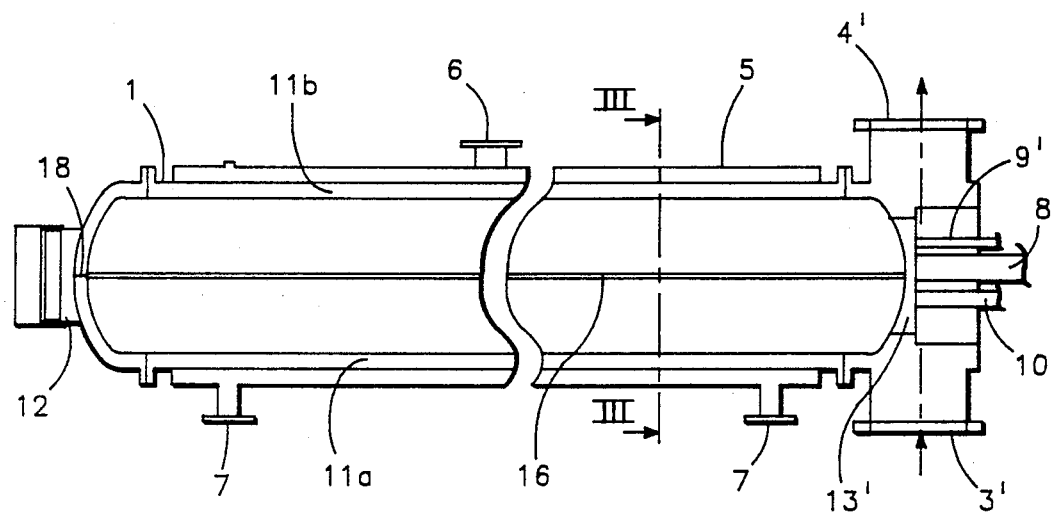
FIG. 2 is a schematic side view similar to FIG. 1 but of another embodiment of the invention.

In the embodiment shown in FIGS. 2 and 3, additional to the above described elements there is included a separation element 16 positioned within the jacket 11 in a diametrical position, separating the jacket 11 into two approximately equal semi-jackets 11a and 11b.

In this embodiment, the inlet orifice 3' and the outlet orifice 4' are positioned at the same end of the exchanger and are connected to the lower semi-jacket 11a and upper semi-jacket 11b respectively. The separation element 16 is provided with gaskets 17 to ensure the separation of the semi-jackets 11a and 11b along the extent of the separation element 16. The semi-jackets 11a and 11b communicate with each other only at the end of the exchanger remote from the inlet and outlet orifices 3' and 4'. To this end, the separation element 16 does not extend to the end of the jacket 11 thereby leaving an opening 18 placing the semi-jackets 11a and 11b in communication with each other.

In this embodiment, the triturated tomatoes enter the heat exchanger at the inlet orifice 3', pass along the lower semi-jacket 11a, through the opening 18 and return along the upper semi-jacket 11b to the outlet orifice 4'.

Although this second embodiment causes a small increase in pressure loss, it gives a higher heat exchanger coefficient. Also, in the case of certain processing plants, it provides greater ease of installation since the inlet and outlet orifices are located at the same end of the heat exchanger. Thus, the connecting conduits to the inlet and outlet orifices are more straightforward.

While the invention has thus far been described with reference to its preferred embodiments other possibilities are likewise possible such as using a construction quite similar to the tube-chest heat exchanger but with the tubes being shaped in dimensions such as to have a cross section elongated in at least one dimension. Thus the circular cross section tubes in the tube-chest heat exchanger may be replaced with tubes having an oval cross section with a 20 to 50 mm. dimension in one direction but perhaps 200 mm in the perpendicular direction. Elongated debris will pass easily when aligned with the 200 mm dimension. Likewise, the objects of the invention may be achieved by the utilization of a series of wide thin tubes being stacked and arranged such that tomatoes pass through alternate tubes while steam is passed through the remaining tubes. Again, the dimensions could be such that the individual tubes have dimensions of 20 to 50 mm in cross sectional height but 200 mm, 400 mm, or more in cross sectional width.

In each case described above a relatively large dimension is provided to avoid the provision of obstruction to vines, weeds and the like and the main goal and advantage of the invention is attained, that is, to eliminate the problems represented by obstruction with foreign bodies in the triturated tomatoes. Thus, there is a substantial reduction in pressure drop due to clogged exchanger tubes and the need for internal cleaning of the exchanger to eliminate debris is likewise substantially reduced. At the same time, the thermal efficiency and exchange capacity are not appreciably decreased. The design represents a major advantage as opposed to exchangers used to date. Mechanically harvested tomatoes have been quite common for a number of years and the trend is increasing further with the result of a likelihood of finding foreign material present with the tomatoes being processed. However, until the present invention the tube chest heat exchanger has been the "state of the art".

What is claimed is:

1. A heat exchanger for processing fruits, vegetables, and other agricultural products having elongated foreign objects of more than five centimeters in length such as pieces of plant, weeds, vines, grass and the like being carried therewith, said heat exchanger comprising:
   a container of elongated shape having a product inlet orifice and a product outlet orifice spaced from said product inlet orifice; a heating body positioned inside said container extending substantially the entire length of said container, said heating body being shaped and arranged to form, between the external surface of said heating body and the internal surface of said container, a jacket connecting said product inlet orifice with said product outlet orifice of said container; said jacket having at least one cross sectional dimension sufficiently large to permit passage therethrough of the agricultural product and the elongated foreign objects of more than five centimeters in length, the ratio of the height of said jacket to said at least one cross sectional dimension being less than 1:7; and
   an external heating shell disposed about said container and forming an external covering to said container.

2. A heat exchanger as defined in claim 1 wherein said container, said heating body and said shell are cylindrical in shape and are coaxially arranged with respect to each other and wherein said jacket has a constant straight annular cross section.

3. A heat exchanger as defined in claim 2 and further comprising a separation element disposed within said jacket in a diametrical position thereby dividing said jacket into first and second semi-jackets, said semi-jackets being in communication with each other at one end of said heat exchanger and said product inlet orifice and said product outlet orifice being in communication respectively with said first and second semi-jackets at the opposite end of said heat exchanger.

4. A heat exchanger as defined in claim 3 wherein said separation element includes gasket means for providing sealed separation between said first and second semi-jackets; said separation element being interrupted in proximity to said one end of said heat exchanger.

5. A heat exchanger in accordance with claim 2 wherein said heating body and said shell are hollow and each is provided with at least one heating fluid inlet and one heating fluid outlet isolated from the interior of said jacket and means to provide heating fluid to said heating fluid inlets.

6. A heat exchanger as defined in claim 1 wherein said product inlet orifice has an inlet having a large open cross section and an outlet having a cross section comparable to that of said jacket, the shape of said inlet orifice comprising a gradual transformation from said large open cross section to the cross section comparable to said jacket.

7. A heat exchanger as defined in claim 6 wherein said container, said heating body and said shell are cylindrical in shape and are coaxially arranged with respect to each other and wherein said jacket has a constant straight annular cross section and the outlet of said inlet orifice has an annular cross section.

8. A heat exchanger as defined in claim 1 wherein the ratio of the height of said jacket to said at least one cross sectional dimension of said jacket is in the range of 1:7 and 1:10.

9. A heat exchanger for processing fruits, vegetables and other agricultural products having elongated foreign objects of more than five centimeters in length such as pieces of plant, weeds, vines, grass and the like being carried therewith, said heat exchanger comprising at least one product passage means for the free passage of agricultural products to be heated and said foreign objects, said product passage having a cross section with a first dimension substantially greater than a second dimension perpendicular to said first dimension, said first dimension being sufficiently large to permit the agricultural product and the elongated foreign objects of more than five centimeters in length to be carried therethrough, the ratio of said second dimension to said first dimension is less than 1:7 and heating means disposed adjacent said passage means.

10. A heat exchanger as defined in claim 9 wherein said heating means comprises a passage for heating fluid.

11. A heat exchanger as defined in claim 9 together with an inlet orifice in communication with said product passage means, the inlet of said inlet orifice having a large open cross section and the outlet of said inlet orifice having a cross section comparable to that of said product passage means, the shape of said inlet orifice comprising a gradual transition from said large open cross section to the cross section comparable to said product passage means.

12. A heat exchanger as defined in claim 1 wherein said product inlet orifice is positioned at one end of said container and said product outlet orifice is positioned at the opposite end of said container.

13. A heat exchanger as defined in claim 1 wherein said at least one cross sectional dimension of said jacket is at least as great as the length of the elongated foreign objects.

14. A heat exchanger as defined in claim 1 wherein said at least one cross sectional dimension of said jacket is substantially greater than 50 mm.

15. A heat exchanger as defined in claim 14 wherein said at least one cross sectional dimension of said jacket is greater than 200 mm.

16. A heat exchanger as defined in claim 1 wherein said jacket has a height of between 20 and 50 mm and wherein said at least one cross sectional dimension of said jacket is substantially greater than 50 mm.

17. A heat exchanger as defined in claim 16 wherein said jacket has a height of between 20 and 50 mm and wherein said at least one cross sectional dimension of said jacket is greater than 200 mm.

18. A heat exchanger as defined in claim 9 wherein said dimension in one direction of the product passage cross section is at least as great as the length of the elongated foreign objects.

19. A heat exchanger as defined in claim 9 wherein said dimension in one direction of the product passage cross section is substantially greater than 50 mm.

20. A heat exchanger as defined in claim 19 wherein said dimension in one direction of the product passage cross section is greater than 200 mm.

* * * * *